United States Patent [19]

Nishimura et al.

[11] Patent Number: 5,013,942
[45] Date of Patent: May 7, 1991

[54] CLOCK SUPPLY CIRCUIT HAVING ADJUSTMENT CAPACITANCE

[75] Inventors: Akira Nishimura, Yokohama; Hiroyuki Watanabe, Tokyo; Eiji Masuda, Kawasaki, all of Japan

[73] Assignee: Kabushiki Kaisha Toshiba, Kawasaki, Japan

[21] Appl. No.: 394,803

[22] Filed: Aug. 17, 1989

[30] Foreign Application Priority Data

Aug. 19, 1988 [JP] Japan ................... 63-205868

[51] Int. Cl.⁵ ............................................ H07K 17/14
[52] U.S. Cl. ..................... 307/480; 307/443; 307/481; 307/591; 307/246
[58] Field of Search ................ 707/443, 448, 480–481, 707/246, 269, 591, 595, 597, 601–603

[56] References Cited

U.S. PATENT DOCUMENTS

| 4,639,615 | 1/1987 | Lee et al. | 307/480 X |
| 4,661,721 | 4/1987 | Ushiku | 307/269 |
| 4,692,633 | 9/1987 | Ngai et al. | 307/480 X |
| 4,812,684 | 3/1989 | Yamagiwa et al. | 307/480 |
| 4,851,717 | 7/1989 | Yabe | 307/443 X |
| 4,868,425 | 9/1989 | Lindenfelsen | 307/443 X |

FOREIGN PATENT DOCUMENTS

| 0181059 | 5/1986 | European Pat. Off. |
| 0258975 | 3/1988 | European Pat. Off. |
| 0025626 | 1/1989 | Japan | 307/480 |

OTHER PUBLICATIONS

Eby G. Friedman, "Design and Analysis of a Hierarchical Clock Distribution System for Synchronous Standard Cell/Macrocell VLSI", IEEE Journal of Solid State Circuits, SC-21 (1986) Apr. No. 2, New York, U.S.A., pp. 240–246.

Primary Examiner—David Hudspeth
Attorney, Agent, or Firm—Foley & Lardner

[57] ABSTRACT

Disclosed is a clock supply circuit operating in a first phase and a second phase. Each buffer provided in each channel operating in the second phase has the same drive ability, and the number of flip-flops which are dependent on each buffer is the same. When the number of the flip-flops is not the same, capacitance means is provided in each channel in order to make conditions uniform for operation in the second phase.

6 Claims, 5 Drawing Sheets

FIRST PHASE | SECOND PHASE

CLOCK SUPPLY CIRCUIT HAVING ADJUSTMENT CAPACITANCE

BACKGROUND OF THE INVENTION

1. Field of the Invention

The present invention relates to a clock supply circuit, and more particularly to a clock supply circuit operating to control an inner clock skew.

2. Description of the Prior Art

In a clock supply circuit in large-scale integrated circuit, the number of flip-flops (F/Fs) which are connected to clock lines is extremely large, and the length of the lines between these flip-flops is long. Therfore, the design of the clock system becomes difficult, and various other problems occur. For example, a delay between two of the flip-flops or an inner clock skew and a time delay while a clock signal supplied from outside of the chip is inputted into the flip-flops in the chip or an outer clock skew are increased. When the outer clock skew is increased, the performance of the LSI is lowered. Accordingly, it is desired to make the outer clock skew as small as possible.

If when the inner clock skew (hereinafter only called clock skew) is increased, a data transfer error occurs between flip-flops which are connected in series, the error causes erroneous operation of the LSI circuit.

For example, in the case when two flip-flops are connected in series, if the degree of a signal transmission delay between a Q output of a flip-flop in a front stage and a D input of flip-flops in a rear stage is smaller than the clock skew, the flip-flops in the rear stage inputs the Q output in the same clock cycle, so that erroneous operation occurs.

To avoid the occurrence of this phenomenon, the delay between the Q output and the D input of the two flip-flops is controlled to be larger than the clock skew. However, when this value is increased, the operation speed of the LSI becomes slower. Accordingly, it is necessary to control the clock skew to be as small as possible.

FIG. 1 shows an example of a centralized system which is also a clock drive system for a group of flip-flops according to the prior art. In this drawing, F/F indicates a flip-flop and BU indicater clock buffer or buffer. Each flip-flop is so connected to a buffer (BU) 1 and a buffer (BU) 2 in a branch structure. The outer clock is inputted into the buffer 1 first, is then inputted into the buffer 2, and thereafter transmitted into each flip-flop from the buffer 2. By arranging the inner clock lines into such a branch form, the difference of the line distance between the buffer 2 to each of the flip-flops is made small, so that the delay between the lines can be controlled to be relatively small. Accordingly, the clock skew can be also controlled to be small.

However, when the circuit scale of the LSI circuit becomes extremely large as in recent practice, the number of flip-flops in some chips reaches several thousands, the total length of the clock lines becomes collectively large, and the difference in the line length from the output of the buffer 2 to each the flip-flops also becomes large.

FIG. 2 shows an example of a distributed drive system which is another clock drive system according to the prior art.

In this drawing, as is similar to FIG. 1, F/F indicates a flip-flop and $BU_{1a}$, $BU_{2a}$, ..., $BU_{Na-1}$, and $BU_{Na}$ (N is a natural number of 1 or more) indicate buffers. Each flip-flop is connected in series to each of the buffers $BU_{2a}$, $BU_{3a}$, ..., and $BU_{N3}$. In this example, the buffers are are arranged and operated in two phases. The buffer 1a generated in a first phase drives the buffers 2a, ..., and Na (N is a natural number of 2 or more) operated in a second phase, and also drives each of the flip-flops which are dependent on each buffer.

In this drive system, for example, the drive ability $\beta_2$ and the drive ability $\beta_{Na-1}$ of the buffer 2a and the buffer Na-1 which respectively have different numbers of the flip-flops are determined in the following manner.

Namely, a delay time $t_{2A2B}$ between a point 2A and a point 2B, and a delay time $T_{2A2C}$ between a point 2A and a point 2C are determined, and then load $C_{2D2E}$ between a point 2D and a point 2E in one clock line, and load $C_{2F2G}$ between a point 2F and a point 2G in the other clock line are determined; Then $\beta_2$ and $\beta_{Na-1}$ are so determined as to satisfy the following equation:

$$t_{2A2B} + T(\beta_2, C_{2D2E}) = t_{2A2C} + T(\beta_{Na-1}, C_{2F2G}) = \text{Constant},$$

(where T is delay time for driving each load).

In the centralized drive system shown in FIG. 1, for example, the line length from a point 1A to a point 1B is different from that from point 1A to a point 1D. Accordingly, a clock delay caused by RC delay on the line occurs, and a clock skew corresponding thereto also occurs. Namely, the clock skew cannot be avoided by the drive system in principle. Particularly, when the scale of the LSI circuit is large, the magnitude of the clock skew cannot be ignored. Moreover, since the system is a collective drive system, it is necessary for the buffer 2 to have a large drive ability to operate the plurality of the flip-flops. Accordingly, a large amount of current should flow locally in the buffer, thus noise and erroneous operation are likely to occur.

While, in the distributed drive system in FIG. 2, complex calculation is required in order to minimize the clock skew, it is also required to provide a plurality of buffers respectively having different drive abilities, thus the circuit design of the system becomes very complex.

When the number of the flip-flops which connected to a specific buffer becomes large, a clock skew occurs between both the terminals of these flip-flops which cannot be ignored.

SUMMARY OF THE INVENTION

It is an object of the present invention to provide a clock supply circuit which can effectively control an inner clock skew in order to solve the above-mentioned problem.

To achieve this object, a clock supply circuit according to the present invention comprises, operated in a first phase, a first buffer and each line from a predetermined point on the output side of the first buffer to an input point of a further buffer in each channel, and, operated in a a dependent phase, each further buffer and a group of flip-flops which is dependent thereon, and the circuit is so constructed as to provide uniform line length and capacitive load or flip-flops in each phase, unify the performance of the buffers in the dependent phase, and adjust load capacitance by providing extra capacitance for adjustment of clock skew.

By construction of the clock supply circuit as mentioned above, uniform load can be driven by the buffers having the same drive ability, so that the clock skew can be reduced.

These and other objects, features and advantages of the present invention will be more apparent from the following description of a preferred embodiment, taken in conjuction with the accompanying drawings.

DETAILED DESCRIPTION OF THE EMBODIMENTS

Figure 1:
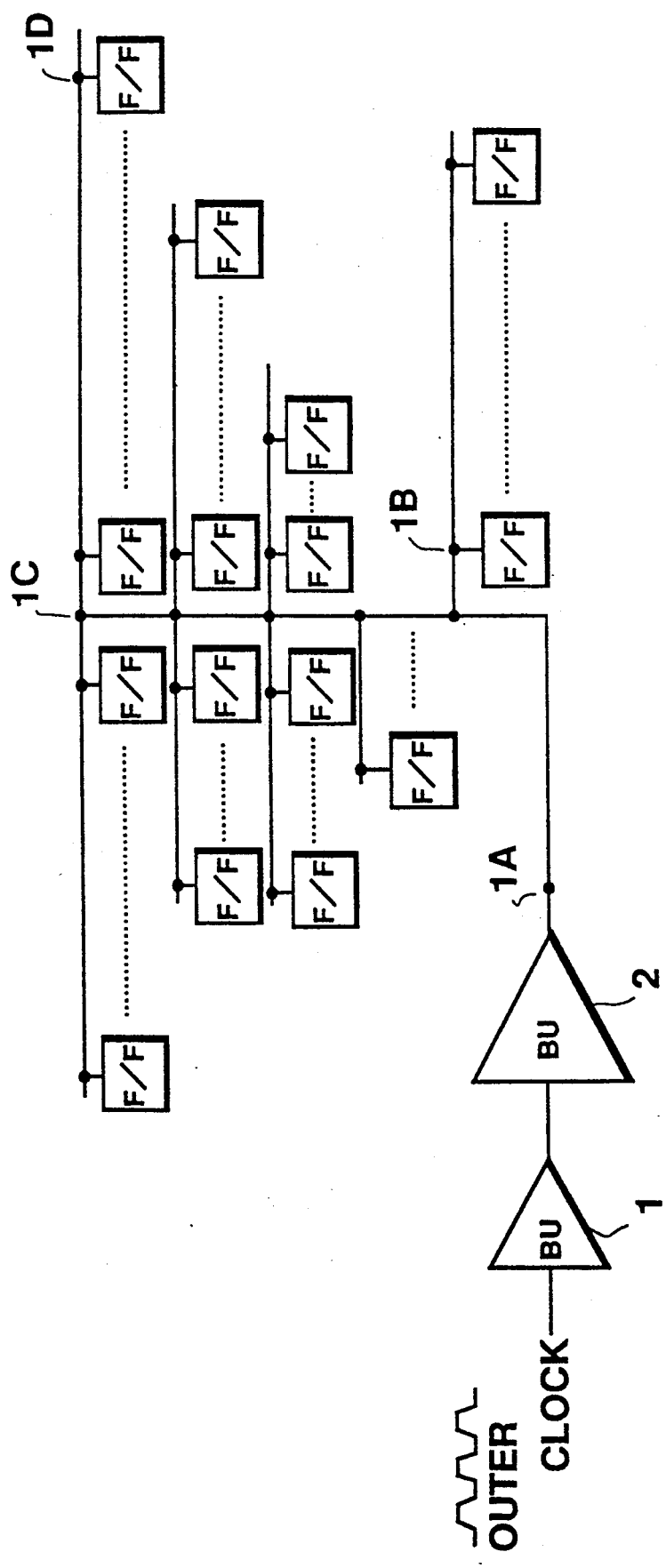
FIG. 1 is a diagram of a clock supply circuit of a centralized drive system according to the prior art.
Figure 2:
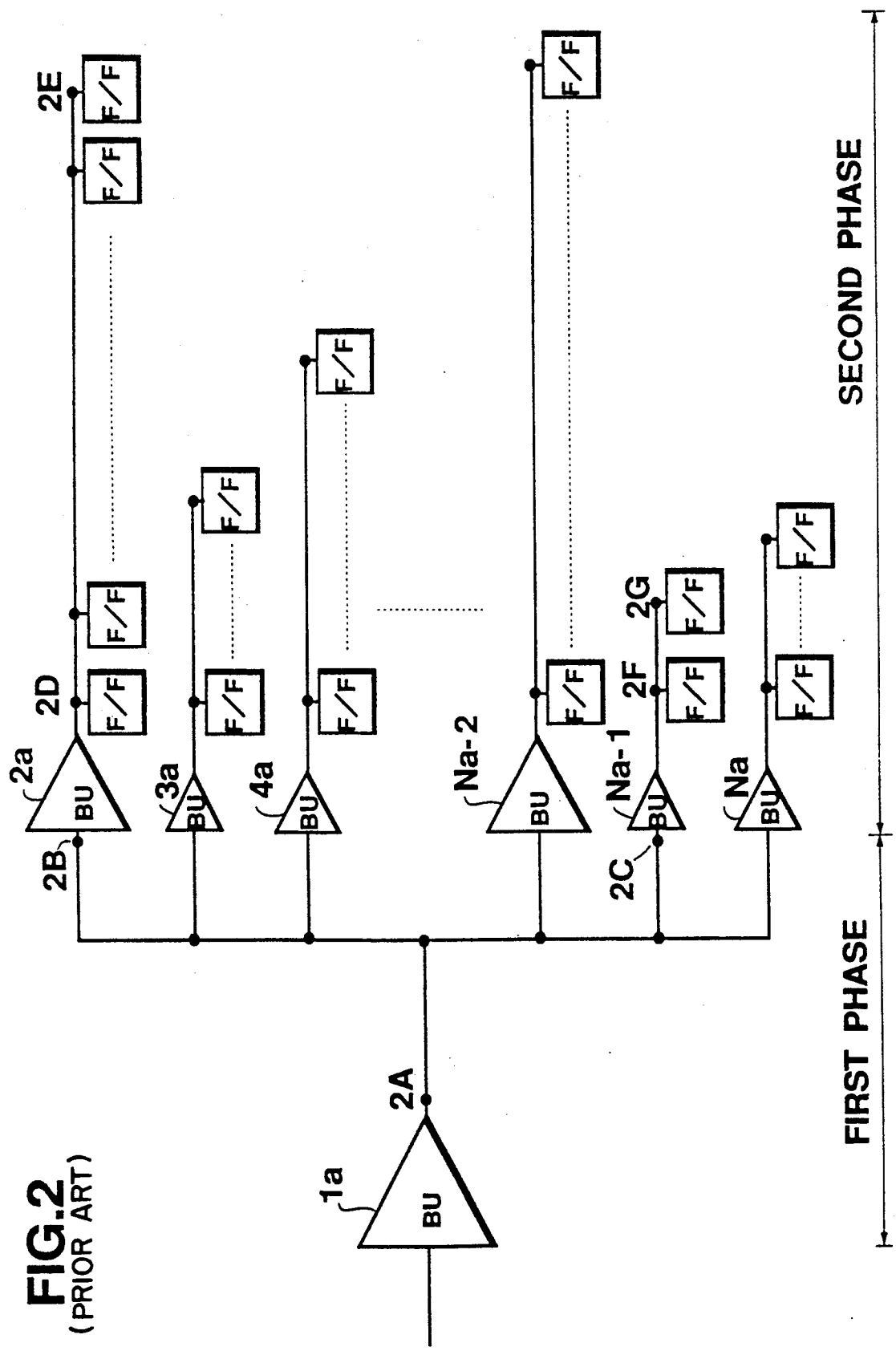
FIG. 2 is a diagram of a clock supply circuit of a distributed drive system according to the prior art.
Figure 3:
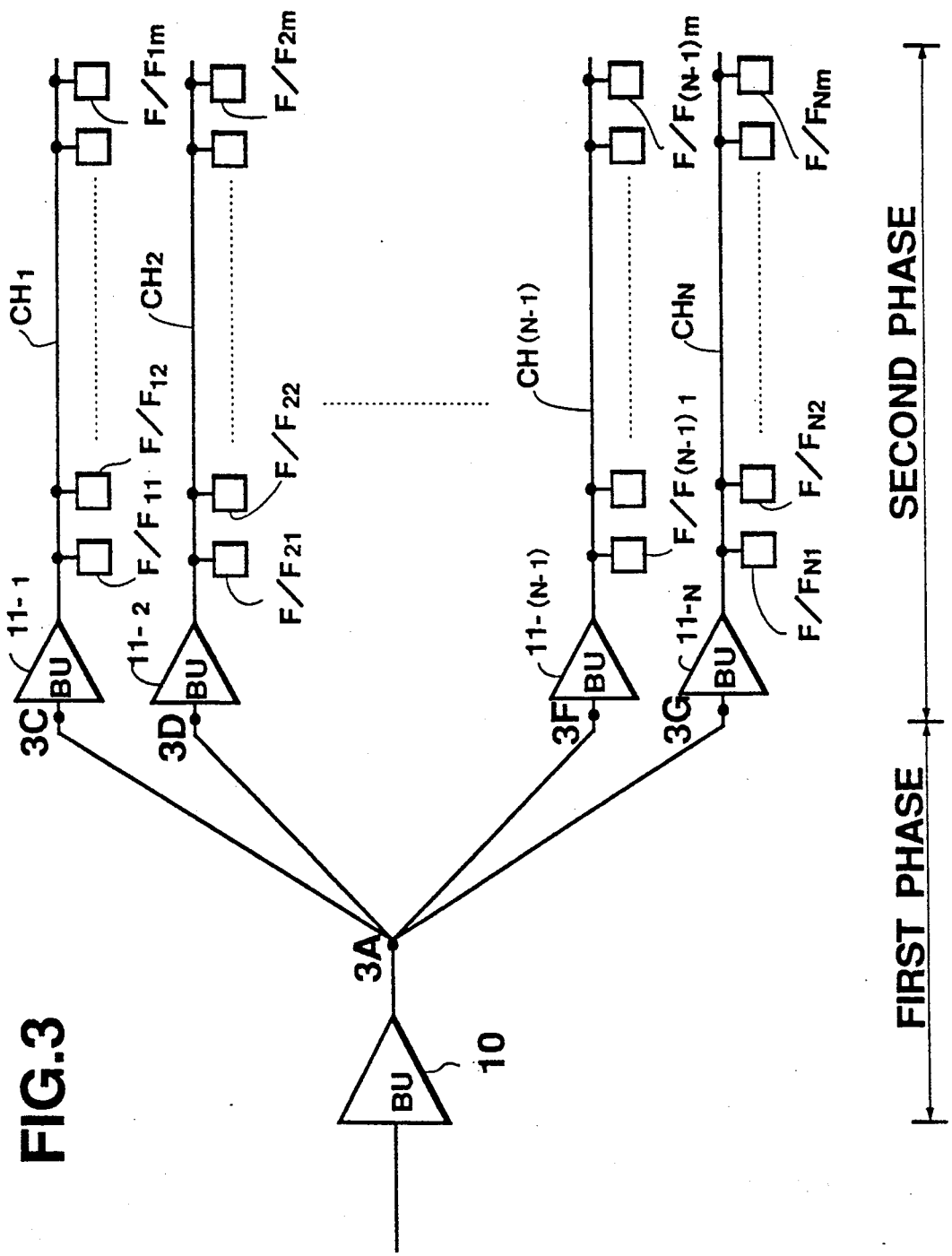
FIG. 3 is a diagram of a clock supply circuit using a drive system that is a first embodiment of the present invention.

FIG. 3 shows a first embodiment of a clock supply circuit according to the present invention. In this drawing, $CH_N$ (N is a natural number) indicates a channel.

In this drawing, each line length, and each line width from a point 3A on the output side of a buffer (BU) 10 to each of buffers $11_{-1}, 11_{-2}, \ldots, 11-(N-1)$, and $11_{-N}$ (N is a natural number) operated in a first phase are respectively constructed to be the same. Moreover, operated in a second phase, the drive ability of the buffers $11_{-1}, 11_{-2}, \ldots, 11_{-(N-1)}$, and $11_{-N}$ are respectively arranged to be same, and the number of each of $F/F_{1m}, F/F_{2m}, \ldots, F/F_{(N-1)m}$, and $F/F_{Nm}$ (m=1, 2, ..., m) connected to each the buffer and the line condition thereof are respectively arranged to be same.

Thus, since the line condition in each phase and the drive ability of each of the dispersed buffers are respectively uniformalized, and the number of the flip-flops which are connected to each of the buffers is arranged to be the same in the embodiment, a clock skew which occurs on operation between each the flip-flops can be controlled to be at a minimum level.

Figure 4:
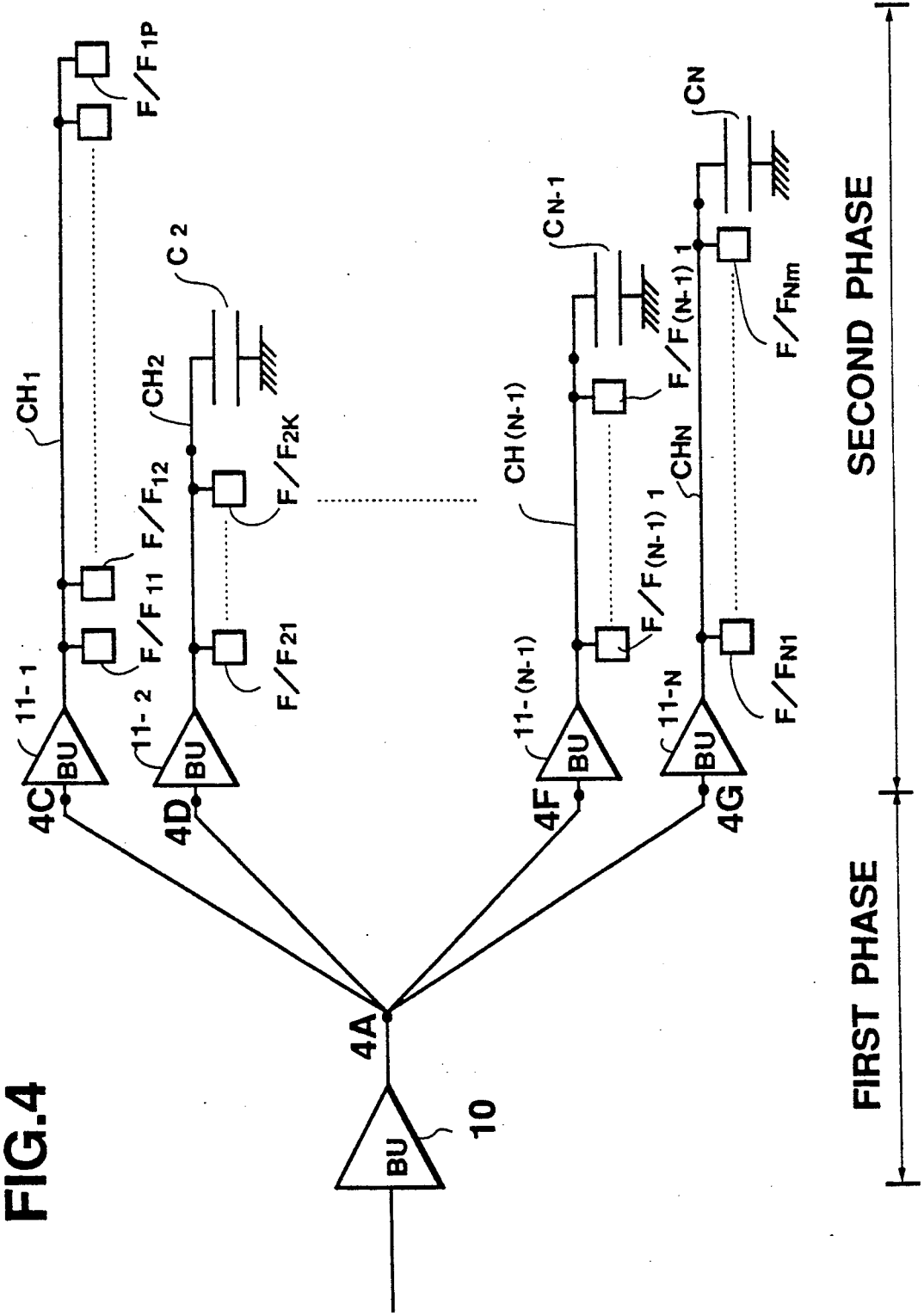
FIG. 4 is a diagram of a clock supply circuit using a drive system that is a second embodiment of the present invention.

FIG. 4 shows a second embodiment of a clock supply circuit according to the present invention.

In this embodiment, line conditions in a first phase are the same as the embodiment which was described in FIG. 3, while the number of flip-flops of each channel ($CH_N$) and each connection linear length for connecting these in a second phase are respectively different. Namely, the line conditions from a point 4A on the output side of a buffer 10 to points 4C, 4D, ..., 4F, and 4G which are respectively input points of buffers $11_{-1}, 11_{-2}$, and $11_{-3}, \ldots, 11_{-N}$ dispersed into the respective channels in the first phase are the same. For example, in the second phase of the same drawing, a channel $CH_1$ has the largest number of flip-flops in these channels. In this case, load capacitances $C_2, C_3, \ldots, C_{N-1}$, and $C_N$ for RC delay adjustment are respectively connected to the end terminals of channels $CH_2, CH_3, \ldots$, and $CH_N$ to which include the buffers $11_{-2}, 11_{-3}, \ldots$, and $11_{-N}$ respectively having a smaller number of flip-flops on the basis of the number of $F/F_{1p}$ (p=1, 2, ..., P) of the buffer $11_{-1}$ in the channel $CH_1$. Each of the load capacitances has an adjusted value in accordance with the number of flip-flops which are connected to each of the buffers $11_{-2}, 11_{-3}, \ldots$, and $11_{-N}$ in each of the channels $CH_2, CH_3, \ldots$, and $CH_N$, and is so adjusted as to provide substantially the same delay as a signal delay in the standard channel $CH_1$ in consideration of the line length of the respective channels $CH_2, CH_3, \ldots$, and $CH_N$.

Namely, the load capacitance $C_N$ is calculated by the following equation:

$$C_N = \text{Shortage of the strain capacitance of the line to the standard channel} + \text{A gate capacitance corresponding to the number of flip-flops which is short for the standard channel.}$$

As a manner of embodying the respective load capacitance, if it can be realized as a gate capacitance of a MOS transistor, the design becomes easy and the overhead relative to an area becomes minimized. With respect to the line length of the standard channel $CH_1$ having a largest number of flip-flops, it is necessary to determine the range from just after the output to the end terminal of the flip-flop where the adverse influence of the clock skew by the RC delay does not occur.

Figure 5:
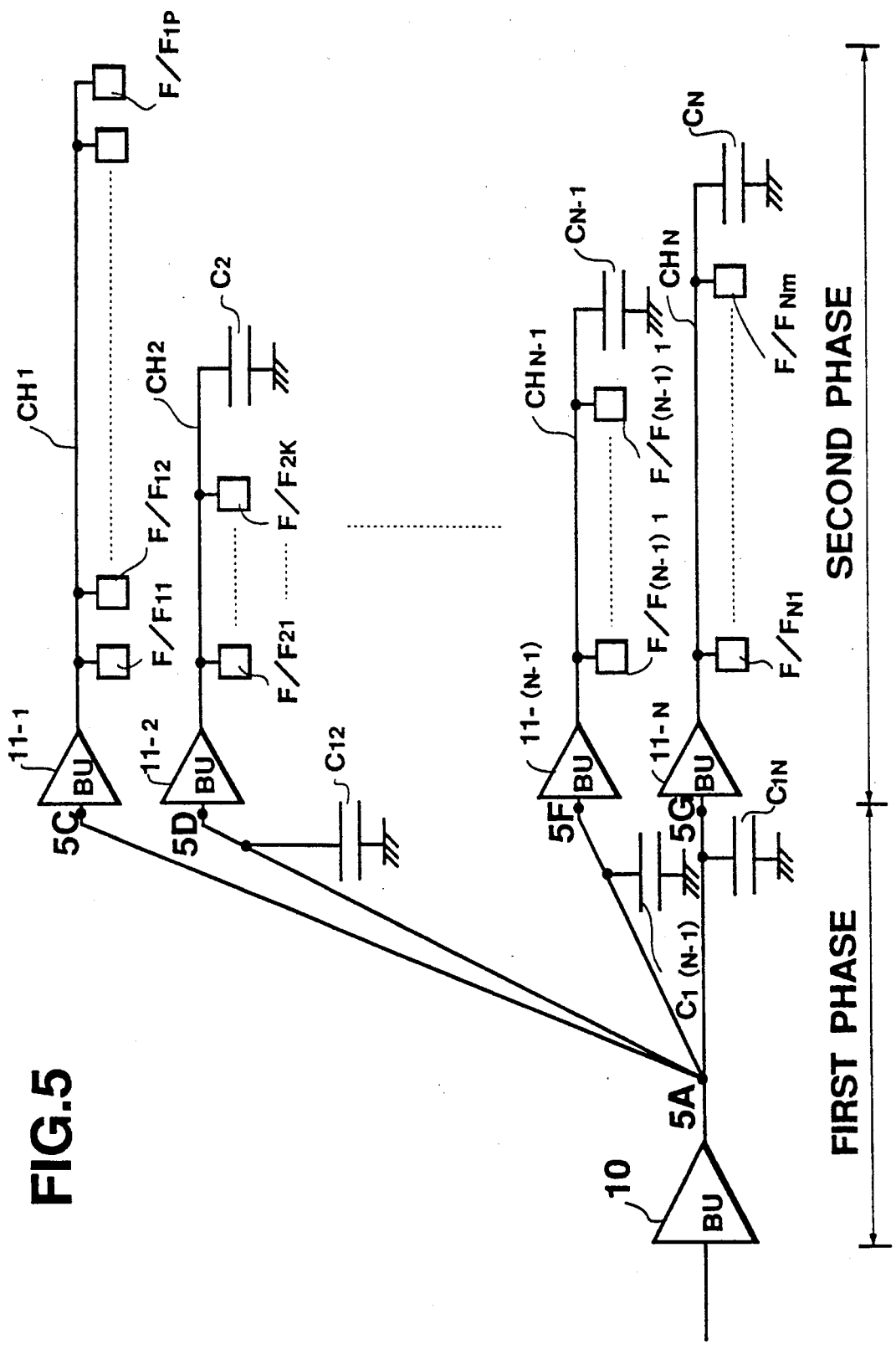
FIG. 5 is a diagram of a clock supply circuit using a drive system that is a third embodiment of the present invention.

FIG. 5 shows a third embodiment of a clock supply circuit according to the present invention. In this embodiment, the construction in a second phase is the same as that of the embodiment in FIG. 4, and the manner of determining the values of the capacitances for the respective adjustments is also the same as that of the embodiment in FIG. 4, thus the detailed description of this matter will be omitted herein.

In this embodiment, input line lengths from a point 5A on the output side of a first buffer 10 to each of points 5C, 5D, ..., 5F, and 5G which are, respectively, input points of buffers $11_{-1}, 11_{-2}, \ldots, 11_{-(N-1)}$, and $11_{-N}$ in a first phase are different from one another. In order to minimize clock skew caused by the differences of the line lengths, there are provided adjustment capacitances $C_{12}, C_{13}, \ldots$, and $C_{1N}$ for prevention of clock skew caused by the RC delay of the input lines having different lengths on the basis of a specific buffer having a longest input line, for example, the buffer $11_{-1}$ in this drawing. In this case, each value of the respective adjustment capacitances can be determined in accordance with the respective shortages of capacitance in the input lines.

Incidentally, in above embodiments, the cases in which the number of the phases is two are described, however, the present invention is not limited by the number of the phases.

As mentioned above, in the clock supply circuit according to the present invention, the construction thereof is divided into a first phase which includes the lines from the first buffer to the input points of the respective buffers which belong to the respective, channels in the next phase, and the second phase comprises the respective buffers and the respective channels including the flip-flops which are connected thereto, and the flip-flops as the load are driven in substantially uniform state of the line conditions in the respective phases. Therefore, the clock skew can be controlled to be small.

Since the respective buffers in the respective channels in the second phase may be of the same kind, and may have the same performance or the same drive ability, it becomes easy to design the circuit.

Moreover, even when there are differences in the line length and the number of the flip-flops which are dependent on the respective channels in the first phase or the second phase or in both, the adjustment can be easily achieved by adding adjustable capacitances so as to adjust the states of the circuit of the respective channels or the line conditions thereof to be substantially uniform. As a result, the clock skew can be controlled to be uniform and small even when the drive ability of the respective buffers in the respective channels fluctuates slightly Various modifications will become possible for those skilled in the art in view of the teachings of the present disclosure without departing from the scope thereof.

What is claimed is:

1. A series connected clock supply circuit operating in at least two phases including a first phase and a second phase comprising:
    a first buffer operating in said first phase;
    a plurality of second buffers coupled in a plurality of channels operating in said second phase, respectively;
    a plurality of flip-flops as load circuits for each of said second buffers in each of said channels operating in said second phase;
    a plurality of first connections connected between an output terminal of said first buffer and an input terminal of each of said second buffers operating in said second phase;
    a plurality of second connections connected between said flip-flops and an output terminal of each of said second buffers in each of said channels; and
    first adjustment capacitance means for adjusting a RC delay in each of said first connections,
    wherein the length of each of said second connections is the same as each other;
    each of said second buffers has an equal drive ability;
    the length of each of said first connections is different from each other; and
    said first adjustment capacitance means is provided in each of said first connections for adjusting any difference of said RC delay among said first connections to be substantially same as each other, except that one of said first connections having a maximum length is not provided with said adjustment capacitance means.

2. A clock supply circuit according to claim 1, wherein each of said first adjustment capacitance means comprises a gate capacitance of a MOS transistor.

3. A series connected clock supply circuit operating in at least two phases including a first phase and a second phase, comprising:
    a first buffer operating in said first phase;
    a plurality of second buffers coupled in a plurality of channels operating in said second phase, respectively;
    a plurality of flip-flips as load circuits for to each of said second buffers in each of said channels operating in said second phase;
    a plurality of first connections connected between an output terminal of said first buffer and an input terminal of each of said second buffers operating in said second phase;
    a plurality of second connections connected between said flip-flops and an output terminal of each of said second buffers in each of said channels; and
    first adjustment capacitance means for adjusting a RC delay of each of said first connections to be substantially the same as each other for said circuit,
    each of said second buffers has an equal drive ability;
    the number of said flip-flops in each of said channels is different;
    the length of each of said second connections is different; and
    second adjustment capacitance means is provided in each of said channels for further adjusting any difference of said RC delay among said channels to be substantially same as each other except for a specific channel having a maximum load comprising a combination of a number of said flip-flops and a wiring length of said specific channel.

4. A clock supply circuit according to claim 3, wherein the length of each of said first connections is different, and
    said first adjustment capacitance means is provided in each of said first connections for adjusting any difference of said RC delay among said first connections to be substantially same as each other except for a specific first connection having a maximum connection length.

5. A clock supply circuit according to claim 4, wherein said first adjustment capacitance means and said second adjustment capacitance means each comprise a gate capacitance of a MOS transistor.

6. A clock supply circuit according to claim 3, wherein said first adjustment capacitance means comprises a gate capacitance of a MOS transistor.

* * * * *